US009734312B1

(12) United States Patent
Salehpour

(10) Patent No.: US 9,734,312 B1
(45) Date of Patent: Aug. 15, 2017

(54) SYSTEMS AND METHODS FOR DETECTING WHEN USERS ARE UNINSTALLING APPLICATIONS

(71) Applicant: Symantec Corporation, Mountain View, CA (US)

(72) Inventor: Jonathon Salehpour, Upland, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/824,539

(22) Filed: Aug. 12, 2015

(51) Int. Cl.
| | | |
|---|---|---|
| G06F 9/445 | (2006.01) | |
| G06F 21/31 | (2013.01) | |
| G06F 9/54 | (2006.01) | |
| G06F 9/44 | (2006.01) | |

(52) U.S. Cl.
CPC .............. G06F 21/31 (2013.01); G06F 8/61 (2013.01); G06F 8/62 (2013.01); G06F 9/4443 (2013.01); G06F 9/542 (2013.01)

(58) Field of Classification Search
CPC ............. G06F 8/61; G06F 8/62; G06F 9/4443
USPC ......................................... 717/174; 715/744
See application file for complete search history.

(56) References Cited

U.S. PATENT DOCUMENTS

| | | | | |
|---|---|---|---|---|
| 6,282,709 | B1 | 8/2001 | Reha et al. | |
| 7,434,167 | B2 * | 10/2008 | Sinclair | G06F 9/4443 345/156 |
| 7,773,096 | B2 * | 8/2010 | de Souza | G06T 1/20 345/619 |
| 7,890,950 | B1 * | 2/2011 | Nanavati | G06F 8/62 705/51 |
| 8,060,933 | B2 * | 11/2011 | Fang | G06F 21/554 713/183 |
| 8,375,381 | B1 * | 2/2013 | Clark | G06F 8/71 717/170 |
| 2002/0083127 | A1 * | 6/2002 | Agrawal | H04L 12/581 709/203 |
| 2002/0122051 | A1 * | 9/2002 | Hose | A63J 25/00 715/716 |

(Continued)

FOREIGN PATENT DOCUMENTS

WO    WO-00/60488    10/2000

OTHER PUBLICATIONS

"Sending Simple Data to Other Apps", http://developer.android.com/training/sharing/send.html, as accessed Jan. 7, 2014, (Jan. 4, 2012).

(Continued)

*Primary Examiner* — Phillip H Nguyen
(74) *Attorney, Agent, or Firm* — FisherBroyles LLP

(57) ABSTRACT

The disclosed computer-implemented method for detecting when users are uninstalling applications may include (1) monitoring, as part of an application installed on a computing device via an accessibility API provided by an operating system of the computing device, accessibility events that indicate state transitions in user interfaces of applications running on the computing device, (2) detecting, based on an analysis of at least one accessibility event, an attempt by a user to uninstall an application from the computing device, and (3) in response to detecting the attempt to uninstall the application, prompting the user to perform at least one action before allowing the application to be uninstalled. Various other methods, systems, and computer-readable media are also disclosed.

20 Claims, 8 Drawing Sheets

(56) References Cited

U.S. PATENT DOCUMENTS

| | | | | |
|---|---|---|---|---|
| 2004/0098526 | A1* | 5/2004 | Matsumoto | G06F 9/52 710/240 |
| 2006/0242712 | A1 | 10/2006 | Linn et al. | |
| 2008/0155302 | A1* | 6/2008 | Mue | G06F 11/1469 714/2 |
| 2010/0199215 | A1 | 8/2010 | Seymour et al. | |
| 2010/0229220 | A1* | 9/2010 | Tsai | G06F 21/88 726/4 |
| 2010/0317401 | A1* | 12/2010 | Lee | G06F 17/30575 455/557 |
| 2011/0047620 | A1 | 2/2011 | Mahaffey et al. | |
| 2011/0099547 | A1* | 4/2011 | Banga | G06F 8/61 717/176 |
| 2011/0154490 | A1* | 6/2011 | DeLuca | G06F 21/56 726/23 |
| 2012/0117127 | A1* | 5/2012 | MacDonald | G06F 8/62 707/822 |
| 2012/0173699 | A1 | 7/2012 | Niemela | |
| 2012/0243043 | A1 | 9/2012 | Asai | |
| 2012/0246630 | A1 | 9/2012 | Kuzins et al. | |
| 2013/0061218 | A1* | 3/2013 | Moore | G06F 8/62 717/177 |
| 2013/0247021 | A1* | 9/2013 | You | G06F 8/61 717/169 |
| 2013/0254880 | A1 | 9/2013 | Alperovitch et al. | |
| 2013/0283377 | A1 | 10/2013 | Das et al. | |
| 2013/0333039 | A1 | 12/2013 | Kelly | |
| 2013/0339937 | A1* | 12/2013 | Meggison, Sr. | G06F 8/62 717/168 |
| 2014/0059691 | A1* | 2/2014 | Wang | G06F 8/62 726/25 |
| 2014/0090077 | A1 | 3/2014 | Jeong et al. | |
| 2014/0096246 | A1 | 4/2014 | Morrissey et al. | |
| 2014/0109186 | A1 | 4/2014 | Oikonomidis | |
| 2014/0130036 | A1* | 5/2014 | Gurikar | G06F 8/61 717/176 |
| 2014/0215366 | A1* | 7/2014 | Ryu | G06F 11/3438 715/765 |
| 2014/0245286 | A1* | 8/2014 | Wong | G06F 8/62 717/174 |
| 2014/0283044 | A1* | 9/2014 | Chen | G06F 21/57 726/22 |
| 2014/0317610 | A1* | 10/2014 | Belfoure | G06F 17/30011 717/168 |
| 2015/0020190 | A1 | 1/2015 | Lee et al. | |
| 2015/0134452 | A1 | 5/2015 | Williams | |
| 2015/0180746 | A1 | 6/2015 | Day, II et al. | |
| 2015/0288756 | A1* | 10/2015 | Larabie-Belanger | H04L 67/1095 715/753 |
| 2016/0188312 | A1* | 6/2016 | Shi | G06F 8/62 717/176 |

OTHER PUBLICATIONS

"Google Play", http://en.wikipedia.org/wiki/Google_Play, as accessed Jan. 7, 2014, Wikipedia, (Mar. 7, 2012).

Anubhav Savant; Systems and Methods for Informing Users About Applications Available for Download; U.S. Appl. No. 14/178,279, filed Feb. 12, 2014.

Zeqing Qi, et al; Systems and Methods for Updating Applications; U.S. Appl. No. 14/305,497, filed Jun. 16, 2014.

Anubhav Savant; Systems and Methods for Providing Information Identifying the Trustworthiness of Applications on Application Distribution Platforms; U.S. Appl. No. 14/338,539, filed Jul. 23, 2014.

Anubhav Savant, et al; Systems and Methods for Modifying Applications Without User Input; U.S. Appl. No. 14/445,704, filed Jul. 29, 2014.

"AccessibilityService", http://developer.android.com/reference/android/accessibilityservice/AccessibilityService.html, as accessed May 30, 2014, Android, (Nov. 15, 2009).

"Digital distribution", http://en.wikipedia.org/wiki/Digital_distribution, as accessed May 30, 2014, Wikipedia, (Jun. 15, 2005).

"Building Accessibility Services", http://developer.android.com/guide/topics/ui/accessibility/services.html, as accessed May 30, 2014, Android, (Apr. 14, 2012).

Anubhav Savant; Systems and Methods for Evaluating Content Provided to Users via User Interfaces; U.S. Appl. No. 14/698,885, filed Apr. 29, 2015.

"ApplicationId versus PackageName", http://tools.android.com/tech-docs/new-build-system/applicationid-vs-packagename, as accessed Mar. 3, 2015, Android Tools Project Site, (Oct. 3, 2014).

Beal, Vangie "API—application program interface", http://www.webopedia.com/TERM/A/API.html, as accessed Mar. 3, 2015, Webopedia, (Jun. 21, 2000).

"AccessibilityEvent", http://developer.android.com/reference/android/view/accessibility/AccessibilityEvent.html, as accessed Mar. 3, 2015, Android Developers, (Oct. 10, 2009).

"Greenify", https://play.google.com/store/apps/details?id=com.oasisfeng.greenify&hl=en, as accessed May 30, 2014, (Jun. 19, 2013).

"Receiving Simple Data from Other Apps", http://developer.android.com/training/sharing/receive.html, as accessed Jan. 7, 2014, (Jan. 3, 2012).

Christopher Woodward; Systems and Methods for Detecting Advertisements Displayed to Users Via User Interfaces; U.S. Appl. No. 14/812,707, filed Jul. 29, 2015.

Ramakrishnan Meenakshi Sundaram; Systems and Methods for Enabling Parental Control Applications to Enforce Rules on Third-Party Applications; U.S. Appl. No. 14/817,236, filed Aug. 4, 2015.

Ramakrishnan Meenakshi Sundaram; Systems and Methods for Protecting Computing Devices From Imposter Accessibility Services; U.S. Appl. No. 14/837,383, filed Aug. 27, 2015.

"Is it possible to detect Android app uninstall?", http://stackoverflow.com/questions/6209730/is-it-possible-to-detect-android-app-uninstall, as accessed Jun. 25, 2015, Stack Overflow, (Jun. 2, 2011).

"Android not receiving Intent Action_Package_Removed in the removed package", http://stackoverflow.com/questions/3648166/android-not-receiving-intent-action-package-removed-in-the-removed-package, as accessed Jun. 25, 2015, Stack Overflow, (Sep. 5, 2010).

"PackageInstaller", https://developer.android.com/reference/android/content/pm/PackageInstaller.html, as accessed Jun. 25, 2015, Android Developers, (Oct. 20, 2014).

"AccessibilityService", http://developer.android.com/reference/android/accessibilityservice/AccessibilityService.html, as accessed Jun. 25, 2015, Android Developers, (Nov. 15, 2009).

"Developing an Accessibility Service", http://developer.android.com/training/accessibility/service.html, as accessed Jun. 25, 2015, Android Developers, (Apr. 13, 2012).

"AlertDialog", http://developer.android.com/reference/android/app/AlertDialog.html, as accessed Jun. 25, 2015, Android Developers, (Feb. 18, 2009).

"Artimys", https://artimysapi.appspot.com/, as accessed Jun. 4, 2015, (2013).

Coyne, Sarah M., et al., "Profanity in Media Associated With Attitudes and Behavior Regarding Profanity Use and Aggression", http://pediatrics.aappublications.org/content/early/2011/10/14/peds.2011-1062.abstract, as accessed Jun. 4, 2015, Pediatrics, American Academy of Pediatrics, (Oct. 17, 2011).

"Android.accessibilityservice", https://developer.android.com/reference/android/accessibilityservice/package-summary.html, as accessed Jun. 4, 2015, Android Developers, (Sep. 22, 2009).

Kraunelis, Joshua et al., "On Malware Leveraging the Android Accessibility Framework", http://www.umac.mo/rectors_office/docs/weizhao_cv/pub_refereed_journals/2015_ref_journals/On%20Malware.pdf, as accessed Jun. 4, 2015, ICST Transactions Preprint, (2013 or earlier).

"Adblock Plus", https://adblockplus.org/, as accessed Jun. 4, 2015, (Aug. 21, 2006).

(56) References Cited

OTHER PUBLICATIONS

"AccessibilityEvent", http://developer.android.com/reference/android/view/accessibility/AccessibilityEvent.html, as accessed Jun. 4, 2015, Android Developers, (Oct. 10, 2009).

* cited by examiner

SYSTEMS AND METHODS FOR DETECTING WHEN USERS ARE UNINSTALLING APPLICATIONS

BACKGROUND

Users may uninstall applications on their computing devices for a variety of reasons. For example, a user may determine that an application is too expensive (e.g., not worth a monthly subscription cost) or that an application is malfunctioning (e.g., the application crashes or lags too frequently.). When users uninstall applications from their devices, creators and/or distributors of the applications may not be notified of the reasons why their application was chosen to be removed. As a result, application developers may be unable to fix or enhance their applications to make them more appealing to users. Furthermore, users may sometimes accidentally uninstall applications, which may result in performance or security deficiencies on their computing devices.

Unfortunately, traditional methods for detecting the uninstallation of applications may be unable to efficiently and accurately determine when users uninstall applications and/or facilitate collecting information about why users uninstalled applications. For example, a conventional technology for detecting the uninstallation of applications may only detect when other applications are uninstalled (e.g., the technology cannot detect when it is being uninstalled). In addition, such technologies may only detect the uninstallation of applications after the uninstallation has been completed (e.g., after a user can be persuaded to keep the application). Therefore, the current application identifies and addresses a need for improved systems and methods for detecting when users are uninstalling applications.

SUMMARY

As will be described in greater detail below, the instant disclosure describes various systems and methods for detecting when users are uninstalling applications by monitoring accessibility events that describe state transitions in user interfaces of applications running on a computing device. In the event that an accessibility event indicates that a user is uninstalling an application, the systems and methods described herein may perform actions such as requesting a user to provide feedback about why they are uninstalling the application and/or prevent an unauthorized user from uninstalling the application.

In one example, a computer-implemented method for performing such a task may include (1) monitoring, as part of an application installed on a computing device via an accessibility Application Program Interface (API) provided by an operating system of the computing device, accessibility events that indicate state transitions in user interfaces of applications running on the computing device, (2) detecting, based on an analysis of at least one accessibility event, an attempt by a user to uninstall an application from the computing device, and (3) in response to detecting the attempt to uninstall the application, prompting the user to perform at least one action before allowing the application to be uninstalled.

In some examples, detecting the attempt by the user to uninstall the application may include determining that the accessibility event indicates that an uninstallation process is currently running on the computing device. Additionally or alternatively, detecting the attempt by the user to uninstall the application may include identifying the application that the user is attempting to uninstall. In some embodiments, identifying the application that the user is attempting to uninstall may include (1) determining that the accessibility event indicates that the user is currently viewing a user interface that alerts the user about the attempt to uninstall the application and (2) identifying the application based on content of the user interface. In such embodiments, identifying the application based on the content of the user interface may include querying, via the accessibility API, the user interface for an indication of a name of the application. Furthermore, in some examples, identifying the application may include determining that the user is attempting to uninstall the application monitoring the accessibility events.

In some embodiments, prompting the user to perform the action may include prompting the user to complete a survey about the user's decision to uninstall the application. In such embodiments, the method may further include transmitting the completed survey to an organization associated with the application. Additionally or alternatively, prompting the user to perform the action may include prompting the user to enter authentication credentials.

In some examples, the method may further include determining that the user has performed the action that the user was prompted to perform. In these examples, the method may then include allowing the application to be uninstalled from the computing device.

In one embodiment, a system for implementing the above-described method may include (1) a monitoring module that monitors, as part of an application installed on a computing device via an accessibility API provided by an operating system of the computing device, accessibility events that indicate state transitions in user interfaces of applications running on the computing device, (2) a detection module that detects, based on an analysis of at least one accessibility event, an attempt by a user to uninstall an application from the computing device, and (3) a prompting module that prompts, in response to the attempt to uninstall the application, the user to perform at least one action before allowing the application to be uninstalled. In addition, the system may include at least one physical processor that executes the monitoring module, the detection module, and the prompting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor, as part of an application installed on the computing device via an accessibility API provided by an operating system of the computing device, accessibility events that indicate state transitions in user interfaces of applications running on the computing device, (2) detect, based on an analysis of at least one accessibility event, an attempt by a user to uninstall an application from the computing device, and (3) in response to detecting the attempt to uninstall the application, prompt the user to perform at least one action before allowing the application to be uninstalled.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
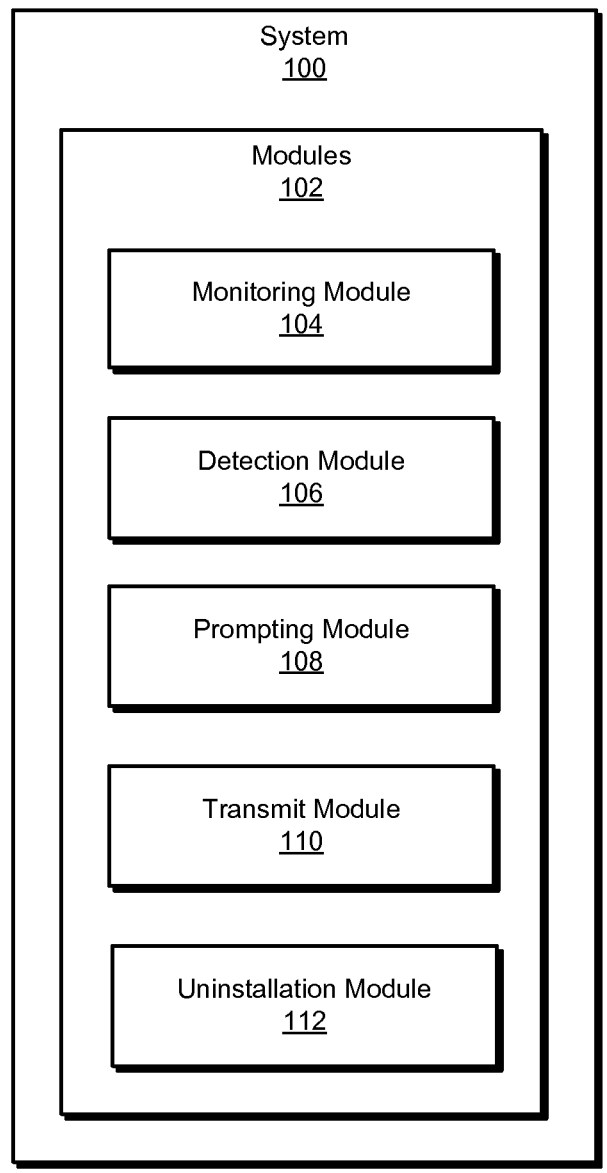
FIG. 1 is a block diagram of an exemplary system for detecting when users are uninstalling applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting when users are uninstalling applications. As will be explained in greater detail below, by monitoring and analyzing accessibility events generated by an accessibility service of a computing device, the systems and methods described herein may detect that a user is attempting to uninstall an application from the computing device. For example, the disclosed systems and methods may determine that a user interface described by an accessibility event identifies an application that a user is currently trying to uninstall (e.g., before the application is successfully uninstalled). By detecting attempts by users to uninstall applications, the disclosed systems and methods may take actions to delay, prevent, authenticate, and/or obtain information about the user's attempts to uninstall the applications.

Figure 2:
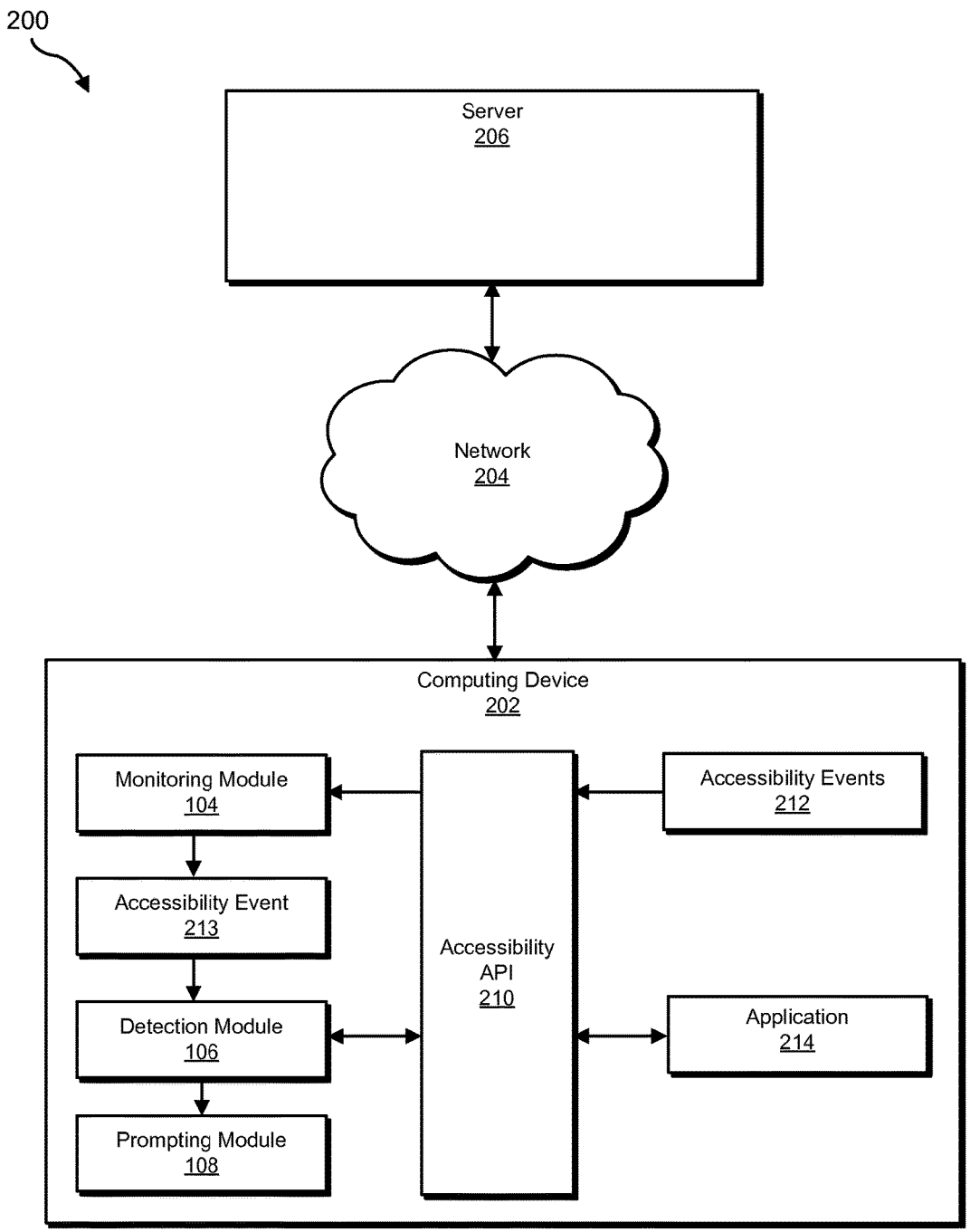
FIG. 2 is a block diagram of an additional exemplary system for detecting when users are uninstalling applications.

The following will provide, with reference to FIGS. 1 and 2, detailed descriptions of exemplary systems for detecting when users are uninstalling applications. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for detecting when users are uninstalling applications. As illustrated in this figure, exemplary system 100 may include one or more modules 102 for performing one or more tasks. For example, and as will be explained in greater detail below, exemplary system 100 may include a monitoring module 104 that monitors, as part of an application installed on a computing device via an accessibility API provided by an operating system of the computing device, accessibility events that indicate state transitions in user interfaces of applications running on the computing device. Exemplary system 100 may also include a detection module 106 that detects, based on an analysis of at least one accessibility event, an attempt by a user to uninstall an application from the computing device.

In addition, and as will be described in greater detail below, exemplary system 100 may include a prompting module 108 that prompts, in response to the attempt to uninstall the application, the user to perform at least one action before allowing the application to be uninstalled. Exemplary system 100 may also include a transmit module 110 that transmits, to an organization associated with the application, feedback from the user about why the user uninstalled the application. Finally, exemplary system 100 may include an uninstallation module 112 that allows the application to be uninstalled after determining that the user has performed the action that the user was prompted to perform. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In the example of FIG. 2, modules 102 may reside client-side on computing device 202. In this example, modules 102 may represent all or a portion of an application downloaded to and/or installed on computing device 202. Furthermore, in some embodiments, computing device 202 may receive the application that contains modules 102 from server 206. Additionally or alternatively, the application that contains modules 102 may send server 206 information provided by a user of computing device 202 about an attempt by the user to uninstall the application.

In one embodiment, one or more of modules 102 from FIG. 1 may, when executed by at least one processor of computing device 202, enable computing device 202 to detect when users are uninstalling applications. For example, and as will be described in greater detail below, monitoring module 104 may cause computing device 202 to monitor, as part of an application installed on computing device 202 via an accessibility API 210, accessibility events 212 that indicate state transitions in user interfaces of applications running on computing device 202. In addition, detection module 106 may cause computing device 202 to detect, based on an analysis of at least one of accessibility events 212 (e.g., accessibility event 213), an attempt by a user to uninstall an application 214 from computing device 202. In response to the attempt by the user to uninstall application 214, prompting module 108 may prompt the user to perform at least one action before allowing application 214 to be uninstalled.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device that is capable of storing, hosting, receiving, and/or providing applications and/or information about applications. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
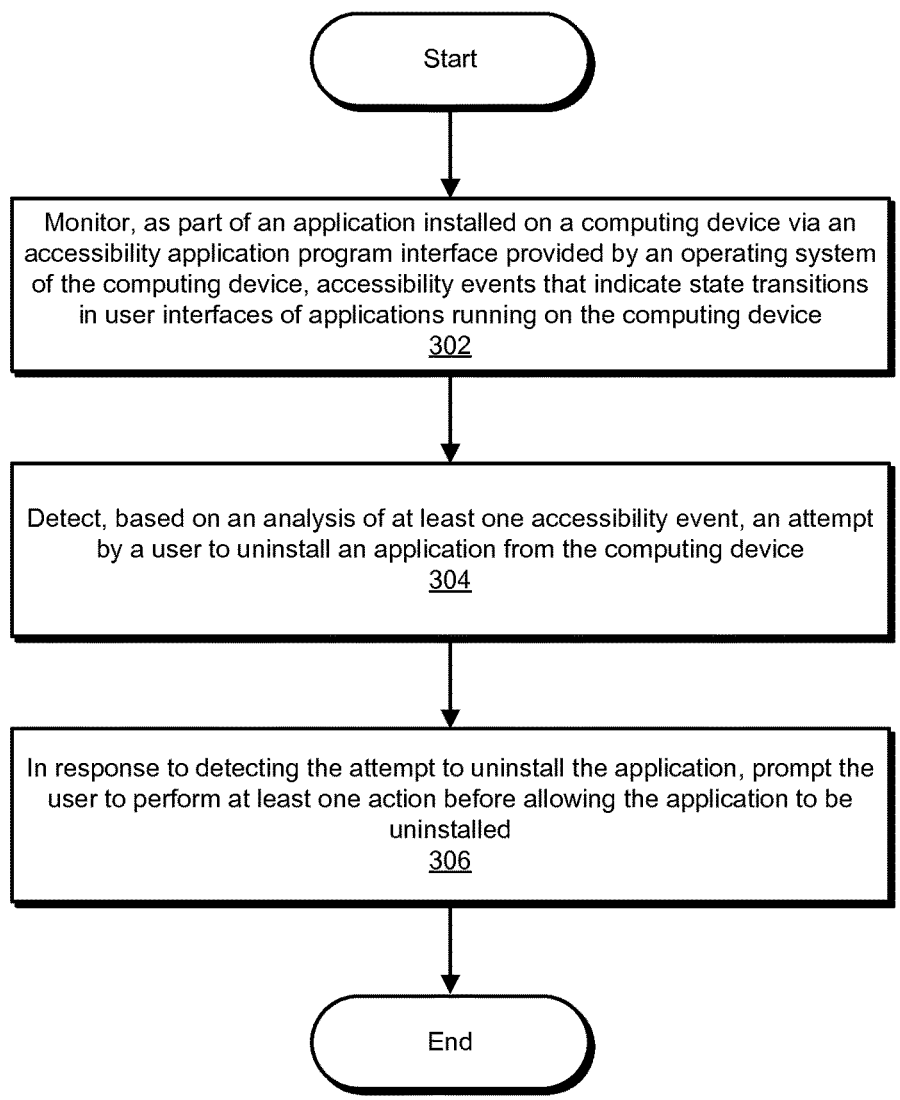
FIG. 3 is a flow diagram of an exemplary method for detecting when users are uninstalling applications.

FIG. 3 is a flow diagram of an exemplary computer-implemented method 300 for detecting when users are uninstalling applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may monitor, as part of an application installed on a computing device via an accessibility API provided by an operating system of the computing device, accessibility events that indicate state transitions in user interfaces of applications running on the computing device. For example, monitoring module 104 may, as part of an application installed on computing device 202 in FIG. 2, via accessibility API 210, monitor accessibility events 212 that indicate state transitions in user interfaces of applications running on computing device 202.

The term "accessibility event," as used herein, generally refers to any type or form of notification or message that contains information about one or more state transitions of a user interface. The phrase "state transition of a user interface," as used herein, generally refers to any type or form of change within a user interface and/or interaction between a user and a user interface. In some examples, a state transition of a user interface may occur as the result of a user providing input to the user interface, such as a user clicking a button within the user interface, changing the focus of the user interface (e.g., by zooming in), and/or entering text into an input field within the user interface.

Additionally or alternatively, a state transition of a user interface may occur as the result of an application running on a computing device, such as text or audio content being displayed to a user, a new window of an application opening, and/or an application requesting user input. In some examples, an operating system of a computing device may detect and/or identify state transitions within the active window of the computing device. The term "active window" as used herein, generally refers to any user interface, notification, or audio-visual display that is currently presented to a user on the screen of a computing device.

In some embodiments, an operating system of a computing device may communicate details about state transitions in user interfaces by providing accessibility events to an accessibility service running on the computing device. The term "accessibility service," as used herein, generally refers to any type of form of application that monitors user interfaces of a computing device. Typically, an accessibility service may monitor user interfaces of a computing device in order to notify a user of the computing device about content within the user interfaces. For example, a typical accessibility service may assist users with audio or visual impairments (e.g., by reading text displayed on a screen, highlighting or enlarging certain elements of a user interface, etc.). Additionally or alternatively, a typical accessibility service may assist users who are temporarily unable to fully interact with their computing device. As will be explained in greater detail below, the systems described herein may be implemented as an accessibility service, but may not act as a typical accessibility service.

Accessibility services may receive accessibility events containing any of a variety of information describing a state transition within a user interface. For example, an accessibility event may include the type of a state transition, the origin, source, and/or context of the state transition, specific text or elements involved in the state transition, the time at which the state transition occurred, and/or any additional information relevant to the state transition.

In some examples, an operating system of a computing device may automatically populate accessibility events with basic information such as the type of an event and/or the time at which the event occurred. Furthermore, in some examples, an accessibility service may request additional information to be included within an event, such as specific details about the source of an event and/or the elements within a user interface involved in an event. Moreover, an accessibility service may require certain permissions in order to access and/or receive certain information associated with accessibility events.

In some embodiments, an operating system may provide accessibility events to an accessibility service via an accessibility API. The term "application program interface," as used herein, generally refers to any type or form of protocol, technique, or tool for interfacing applications and/or components of applications. An API may transfer information or data from one application to another, enable one application to integrate its functionality into another application, provide graphical user interfaces to users, enable an application to query another application for specific information, and/or perform any suitable function within or between software applications. The term "accessibility API," as used herein, generally refers to any type or form of API that facilitates the transfer of information associated with state transitions in user interfaces. As will be explained in greater detail below, an accessibility API may enable an accessibility service to receive accessibility events from an operating system and/or query an application about content displayed on a user interface of the application.

The systems described herein may monitor accessibility events in a variety of ways. In some examples, one or more of modules 102 may represent all or a portion of an application that is configured and registered as an accessibility service or similar service. In one example, the application may be designed specifically to detect the uninstallation of other applications on a computing device. In another example, the application may be another type of application (e.g., a security or gaming application) that utilizes modules 102 to detect when it is being uninstalled by a user. In addition, the application may be configured as an accessibility service designed to operate on any of a variety of mobile and non-mobile platforms, such as ANDROID, iOS, WINDOWS, and/or UNIX systems. In some examples, the application may be unable to receive accessibility events via an accessibility API before a user provides the application with permissions required by an accessibility service. As such, monitoring module 104 may prompt (by, e.g., displaying a pop-up window or notification within a user interface) a user to enable the required permissions.

While all or a portion of the systems described herein may be implemented as an application that is registered as an accessibility service, the systems described herein may not necessarily perform the duties typically associated with an accessibility service (e.g., providing user interface enhancements for disabled individuals). Instead, the systems described herein may leverage the framework of an accessibility service in order to monitor content provided to users via user interfaces.

After modules 102 are registered as a service that has access to an accessibility API, monitoring module 104 may receive accessibility events via the accessibility API. In some examples, the operating system of the computing device on which modules 102 are implemented may forward accessibility events to monitoring module 104 in response to each state transition that occurs within a user interface on the computing device. However, in other examples, monitoring module 104 may request only accessibility events that describe certain types of events. For example, monitoring module 104 may request accessibility events that directly indicate that a user may be attempting to uninstall an application, such as by requesting accessibility events associated with uninstallation processes. The term "uninstallation process," as used herein, generally refers to any type or form of process, program, application, or portion of executable code installed on and/or configured as part of the operating system of a computing device that facilitates removing other processes, programs, or applications from the memory of the computing device.

Returning to FIG. 3, at step 304 one or more of the systems described herein may detect, based on an analysis of at least one accessibility event, an attempt by a user to uninstall an application from the computing device. For example, detection module 106 may, as part of computing device 202 in FIG. 2, detect, based on an analysis of accessibility event 213, an attempt by a user to uninstall application 214 from computing device 202.

The systems described herein may analyze an accessibility event to detect an attempt to uninstall an application in a variety of ways. In some examples, monitoring module 104 may forward all or a portion of accessibility events received via an accessibility API to detection module 106. In the event that monitoring module 104 did not request to only receive accessibility events associated with particular processes, detection module 106 may analyze accessibility events forwarded from monitoring module 104 to determine which accessibility events indicate that a user is attempting to uninstall an application. For example, detection module 106 may filter out accessibility events not associated with processes or packages likely to be involved in uninstalling applications (such as uninstallation processes).

Figure 4:
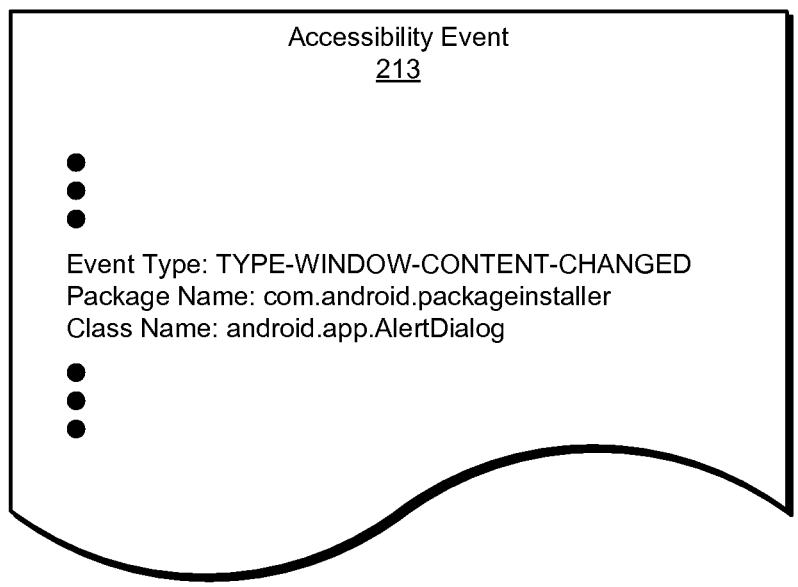
FIG. 4 is an illustration of an exemplary accessibility event.

As an example of an accessibility event that may indicate an attempt to uninstall an application, FIG. 4 illustrates a portion of the information that may be included in one embodiment of accessibility event 213. In this example, accessibility event 213 may represent an accessibility event provided by an ANDROID operating system. As shown in FIG. 4, accessibility event 213 may include an event type of a state transition (i.e., "TYPE_WINDOW_CONTENT_CHANGED") and a package name of the application involved in the state transition (i.e., "com.android.packageinstaller"). In this example, detection module 106 may determine that the "com.android.packageinstaller" package is the package name of ANDROID'S installation/uninstallation process. Detection module 106 may detect an attempt to uninstall an application based on identifying the uninstallation process (and any additional information) within accessibility event 213.

Detection module 106 may determine that an accessibility event indicates an attempt to uninstall an application in any additional manner, such as by determining that the accessibility event describes a user selecting an application for uninstallation and/or otherwise directing a computing device to uninstall an application. In some examples, the systems described herein may perform one or more actions (as described below) in response to detecting each attempt by a user to uninstall an application (i.e., regardless of which application is being uninstalled). However, in other examples, the systems described herein may only perform an action and/or require a user to perform an action in response to detecting that a particular application is being uninstalled. For example, after determining that an accessibility event indicates that a user may be attempting to uninstall an application, detection module 106 may further analyze the accessibility event and/or the user interface involved in the state transition described by the accessibility event to identify which application the user is attempting to uninstall. The systems described herein may then perform (or not perform) an action based on the identified application that is being uninstalled.

Detection module 106 may analyze an accessibility event and/or user interface to identify an application being uninstalled in a variety of ways. In one embodiment, detection module 106 may search accessibility events containing the package name of an uninstallation process for an indication that the uninstallation process is currently displaying a user interface that alerts a user about an attempt to uninstall an application. Referring to the example of FIG. 4, detection module 106 may search accessibility event 213 for a class name that indicates the ANDROID uninstallation process is displaying a certain type of dialog box. In this example, detection module 106 may identify a class name of "android.app.AlertDialog," which may indicate that the ANDROID uninstallation process is currently displaying a dialog box that contains information about an attempt to uninstall an application.

Figure 5:
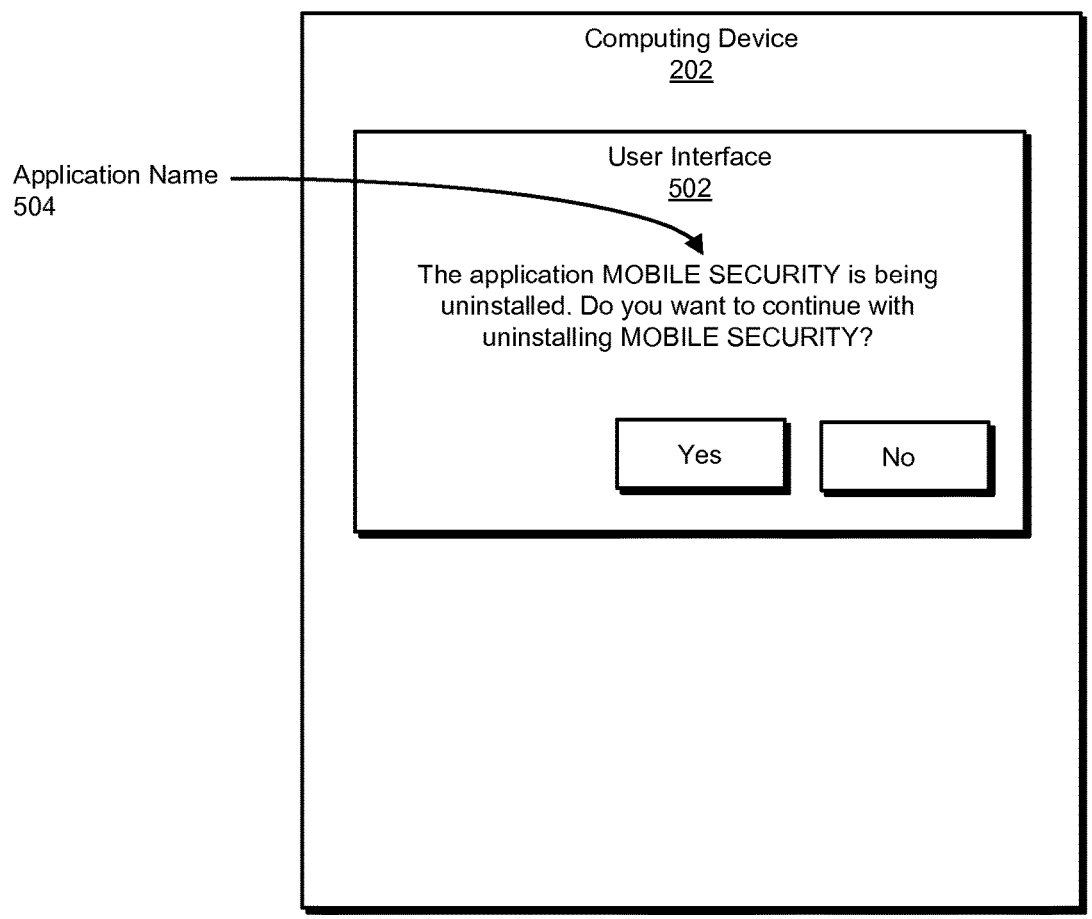
FIG. 5 is an illustration of an exemplary user interface that alerts a user about an attempt to uninstall an application.

After determining that an accessibility event indicates that a user interface of an uninstallation process may be displaying information about an attempt to uninstall an application, detection module 106 may analyze content of the user interface to identify the application. For example, detection module 106 may query, via the accessibility API that provided the accessibility event, the user interface for an indication of the name, creator, publisher, and/or developer of the application. As an example, FIG. 5 illustrates a user interface 502 displayed within the screen of computing device 202. In this example, user interface 502 may be provided by the ANDROID uninstallation process described by accessibility event 213 in FIG. 4. As shown in FIG. 5, user interface 502 may indicate to a user that the application "MOBILE SECURITY" is being uninstalled. In addition, user interface 502 may prompt the user to choose whether or not to continue with the uninstallation of the MOBILE SECURITY application. In this example, detection module 106 may search user interface 502 for an application name 504 to identify the MOBILE SECURITY application.

Detection module 106 may identify an application that a user is attempting to uninstall in any additional or alternative manner, such as by identifying the name of an application within an accessibility event and/or an icon of an application within a user interface. After identifying an application that a user is attempting to uninstall, detection module 106 may determine whether the name and/or type of the application indicates that an action should be performed before the application is allowed to be uninstalled. For example, detection module 106 may compare the name and/or type of the application to a list or database that stores actions that should be performed when particular applications are being uninstalled. The list or database may reside within the computing device on which the application is being uninstalled and/or within an external server (such as server 206 in FIG. 2).

In an exemplary embodiment, detection module 106 may determine that an application that a user is attempting to uninstall is the application that includes modules 102. For example, detection module 106 may determine that an application name displayed in a user interface provided by an uninstallation process matches the name of the application that stores and/or executes modules 102. As such, unlike some traditional technologies that may only be capable of determining when an application external to itself has been uninstalled, the systems described herein may enable an application to determine when it is the application that a user is attempting to uninstall.

Returning to FIG. 3, at step 308 one or more of the systems described herein may prompt, in response to detecting the attempt to uninstall the application, the user to perform at least one action before allowing the application to be uninstalled. For example, prompting module 108 may, as part of computing device 202 in FIG. 2, prompt, in response to the attempt to uninstall application 214, the user to perform at least one action before allowing application 214 to be uninstalled.

The systems described herein may prompt a user to perform an action before allowing the uninstallation of an application in a variety of ways. In some examples, prompting module 108 may prompt a user to perform an action to delay, prevent, and/or authenticate the user's attempt to uninstall an application. In one embodiment, prompting module 108 may direct a user to enter authentication credentials before allowing an application to be uninstalled. For example, prompting module 108 may require that a user enters a certain username, password, and/or passcode to verify the identity of the user. In this way, prompting module 108 may ensure that unauthorized users do not tamper with applications installed on a user's computing device. Similarly, prompting module 108 may require a user to perform a small task (such as completing a CAPTCHA or solving a puzzle) before allowing the uninstallation of an application.

As such, prompting module 108 may prevent users from accidentally or inadvertently uninstalling applications.

Figure 6:
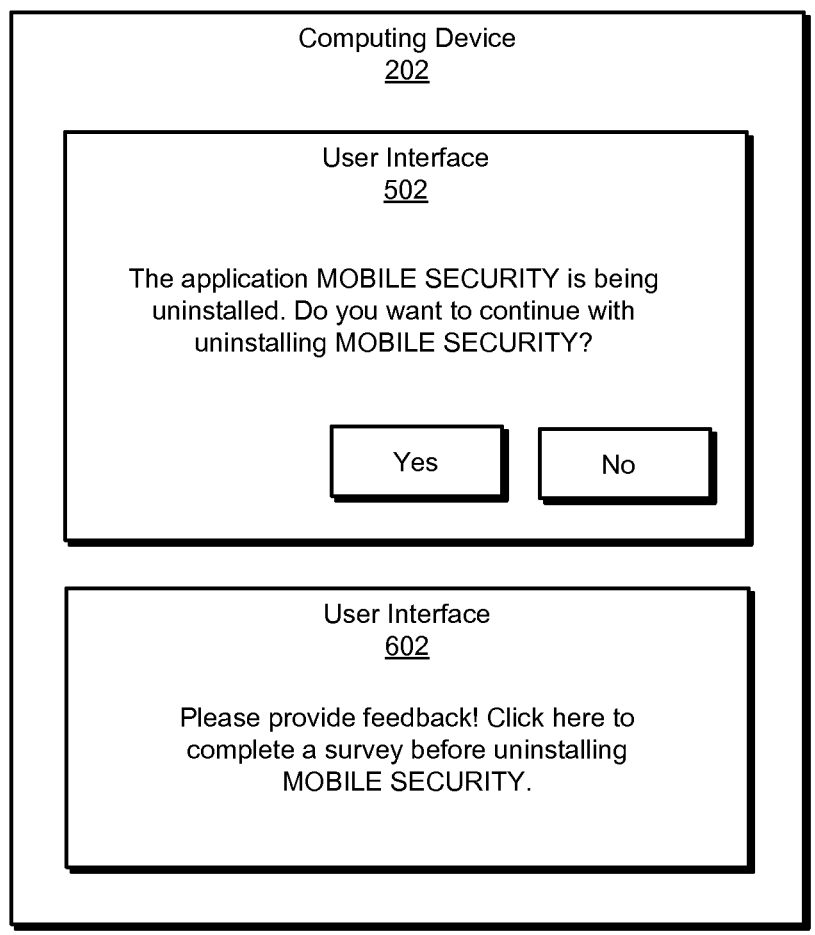
FIG. 6 is an illustration of an exemplary user interface that prompts a user to complete a survey before an application is uninstalled.

Additionally or alternatively, prompting module 108 may prompt a user to provide information about the user's decision to uninstall an application. For example, prompting module 108 may direct a user to complete a survey about factors that contributed to why the user is uninstalling the application (e.g., a trial period for the application is too short, the application has fewer features than a competitor's application, the application malfunctions, the application is too expensive, etc.). As an example, FIG. 6 illustrates a user interface 602 that prompts a user to complete a survey before uninstalling the MOBILE SECURITY application described in FIG. 5. In this example, prompting module 108 may display user interface 602 beneath user interface 502 within the screen of computing device 202. In addition, prompting module 108 may prevent the user from entering input (e.g., selecting "Yes" or "No") into user interface 502 before the user clicks on user interface 602. After clicking on user interface 602, prompting module 108 may redirect (e.g., by displaying an additional user interface or opening a webpage) the user to a survey about the user's decision to uninstall the MOBILE SECURITY application.

In some examples, the systems described herein may facilitate providing information about why a user is uninstalling an application to an organization or developer associated with the application. For example, transmit module 110 may transmit completed surveys about an application to an administrator or database of an organization that created the application. In this way, organizations may receive feedback from customers that enables the organizations to fix or enhance existing applications and/or create new applications that better meet the needs of the customers.

Notably, the systems described herein may detect an attempt to uninstall an application and prompt a user to perform an action associated with the attempt to uninstall the application before the application is actually uninstalled. For example, the systems described herein may perform actions such as preventing a user from entering input that would direct an uninstallation process to complete an uninstallation and/or block or close an uninstallation process until determining that a user has completed a certain task. Unlike some traditional technologies that only detect the uninstallation of applications after the uninstallation process has been completed, the systems described herein may detect and interrupt attempts to uninstall an application so that the application may prevent, authenticate, and/or obtain information about its uninstallation.

Furthermore, in some embodiments, the systems described herein may determine that a user has completed an action that prompting module 108 prompted the user to complete. For example, uninstallation module 112 may determine that a user has entered an appropriate passcode and/or completed an uninstallation-feedback survey. After determining that a user has successfully completed a requested action, uninstallation module 112 may allow an application to be uninstalled. For example, uninstallation module 112 may allow a user to enter input that directs an uninstallation process that was uninstalling the application to proceed or automatically trigger the uninstallation process to proceed.

As explained above, an application running on a computing device may monitor accessibility events generated by the computing device. Based on an analysis of an accessibility event and/or a user interface of a process running on the computing device, the application monitoring the accessibility events may determine that a user is attempting to uninstall an application from the computing device. After determining that the user is attempting to uninstall the application (and before the application is uninstalled), the application monitoring the accessibility events may prompt a user to perform any action to delay, prevent, authenticate, and/or obtain information about the user's attempt to uninstall the application.

Figure 7:
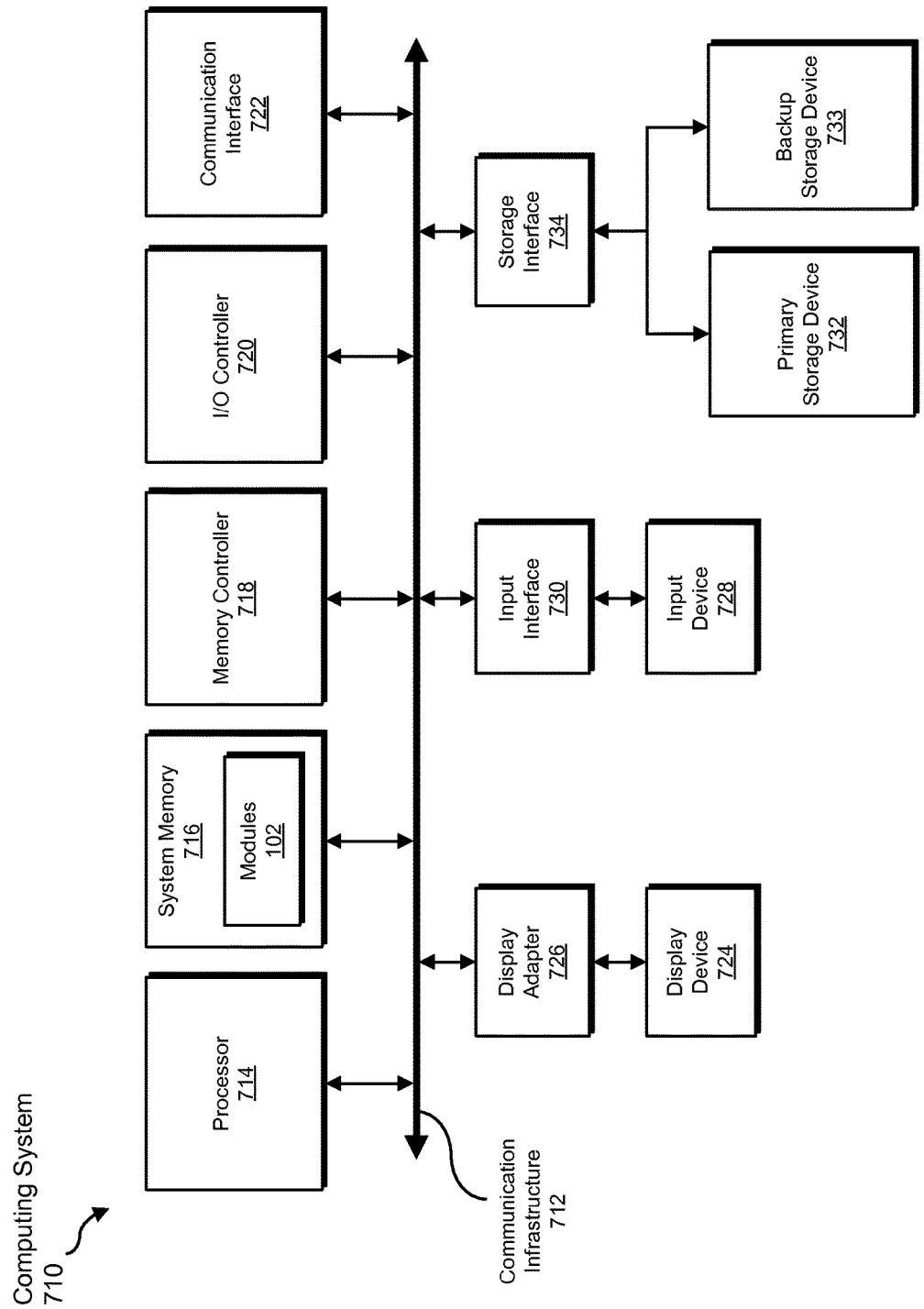
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
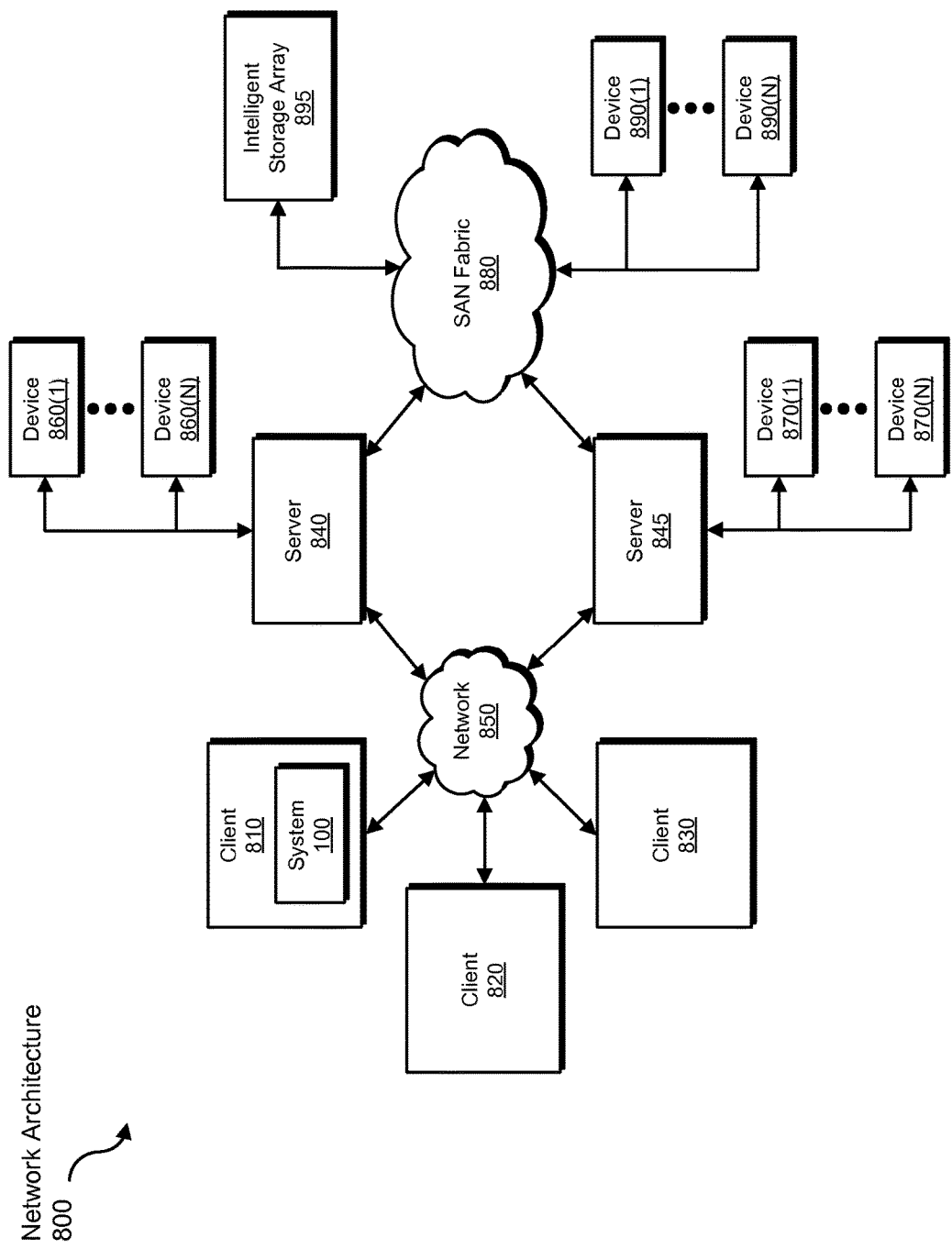
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for detecting when users are uninstalling applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an accessibility event to be transformed, transform the accessibility event into an indication that a user is attempting to uninstall an application, output a result of the transformation to the user, use the result of the transformation to prevent, authenticate, and/or obtain information about the attempted uninstallation, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting when users are uninstalling applications, at least a portion of the method being performed by a computing device comprising at least one processor, the method comprising:

registering a program installed on the computing device as an accessibility service to enable the program to receive, via an accessibility application program interface provided by an operating system of the computing device, accessibility events designed to enable the accessibility service to assist impaired users when interacting with the computing device by describing changes in content of user interfaces of applications running on the computing device;

after registering the program as the accessibility service, receiving, via the accessibility application program interface, accessibility events in response to at least a portion of the changes in content of the user interfaces of the applications running on the computing device;

detecting an attempt by a user to uninstall an application from the computing device by determining that a change in a user interface described by at least one accessibility event occurred as a result of input the user provided to the user interface to prompt an uninstallation process to run on the computing device; and in response to detecting the attempt to uninstall the application, prompting the user to perform at least one action before allowing the application to be uninstalled.

2. The method of claim 1, wherein the accessibility events provided by the accessibility service further identify processes responsible for presenting the user interfaces to the user.

3. The method of claim 1, wherein detecting the attempt by the user to uninstall the application further comprises identifying the application that the user is attempting to uninstall.

4. The method of claim 3, wherein identifying the application that the user is attempting to uninstall comprises:

determining that the accessibility event indicates that the user is currently viewing a user interface that alerts the user about the attempt to uninstall the application; and identifying the application based on content of the user interface.

5. The method of claim 4, wherein identifying the application based on the content of the user interface comprises querying, via the accessibility application program interface, the user interface for an indication of a name of the application.

6. The method of claim 3, wherein identifying the application that the user is attempting to uninstall comprises determining that the user is attempting to uninstall the application monitoring the accessibility events.

7. The method of claim 1, wherein prompting the user to perform the action comprises prompting the user to complete a survey about the user's decision to uninstall the application.

8. The method of claim 7, further comprising transmitting the completed survey to an organization associated with the application.

9. The method of claim 1, wherein prompting the user to perform the action comprises prompting the user to enter authentication credentials.

10. The method of claim 1, further comprising:

determining that the user has performed the action that the user was prompted to perform; and allowing the application to be uninstalled from the computing device.

11. A system for detecting when users are uninstalling applications, the system comprising:

a monitoring module, stored in memory, that:

registers a program installed on a computing device as an accessibility service to enable the program to receive, via an accessibility application program interface provided by an operating system of the computing device, accessibility events designed to enable the accessibility service to assist impaired users when interacting with the computing device by describing changes in content of user interfaces of applications running on the computing device; and after registering the program as the accessibility service, receives, via the accessibility application program interface, accessibility events in response to at least a portion of the changes in content of the user interfaces of the applications running on the computing device;

a detection module, stored in memory, that detects an attempt by a user to uninstall an application from the computing device by determining that a change in a user interface described by at least one accessibility event occurred as a result of input the user provided to the user interface to prompt an uninstallation process to run on the computing device;

a prompting module, that prompts, in response to the attempt to uninstall the application, the user to perform at least one action before allowing the application to be uninstalled; and at least one physical processor configured to execute the monitoring module, the detection module, and the prompting module.

12. The system of claim 11, wherein the accessibility events provided by the accessibility service further identify processes responsible for presenting the user interfaces to the user.

13. The system of claim 11, wherein the detection module further detects the attempt by the user to uninstall the application by identifying the application that the user is attempting to uninstall.

14. The system of claim 13, wherein the detection module identifies the application that the user is attempting to uninstall by:

determining that the accessibility event indicates that the user is currently viewing a user interface that alerts the user about the attempt to uninstall the application; and identifying the application based on content of the user interface.

15. The system of claim 13, wherein the detection module identifies the application that the user is attempting to uninstall by determining that the user is attempting to uninstall the application monitoring the accessibility events.

16. The system of claim 11, wherein the prompting module prompts the user to perform the action by prompting the user to complete a survey about the user's decision to uninstall the application.

17. The system of claim 16, further comprising a transmit module that transmits the completed survey to an organization associated with the application.

18. The system of claim 11, wherein the prompting module prompts the user to perform the action by prompting the user to enter authentication credentials.

19. A non-transitory computer-readable medium comprising one more computer-executable instructions that, when executed by at least one processor of a computing device, cause the computing device to:

register a program installed on the computing device as an accessibility service to enable the program to receive, via an accessibility application program interface provided by an operating system of the computing device, accessibility events designed to enable the accessibility service to assist impaired users when interacting with the computing device by describing changes in content of user interfaces of applications running on the computing device;

after registering the program as the accessibility service, receive, via the accessibility application program interface, accessibility events in response to at least a portion of the changes in content of the user interfaces of the applications running on the computing device;

detect an attempt by a user to uninstall an application from the computing device by determining that a change in a user interface described by at least one accessibility event occurred as a result of input the user provided to the user interface to prompt an uninstallation process to run on the computing device; and in response to detecting the attempt to uninstall the application, prompt the user to perform at least one action before allowing the application to be uninstalled.

20. The method of claim 1, wherein monitoring the accessibility events received by the application comprises requesting to receive, from the operating system via the accessibility application program interface, accessibility events associated with uninstallation processes.

* * * * *